(12) United States Patent
Gallusser et al.

(10) Patent No.: US 12,335,576 B2
(45) Date of Patent: Jun. 17, 2025

(54) IDENTIFICATION OF BRIDGE ITEM BASED ON TARGET OUTPUT

(71) Applicant: Disney Enterprises, Inc., Burbank, CA (US)

(72) Inventors: Fabian Gallusser, Palo Alto, CA (US); Lian Jian, San Jose, CA (US)

(73) Assignee: Disney Enterprises, Inc., Burbank, CA (US)

( * ) Notice: Subject to any disclaimer, the term of this patent is extended or adjusted under 35 U.S.C. 154(b) by 44 days.

(21) Appl. No.: 18/160,161

(22) Filed: Jan. 26, 2023

(65) Prior Publication Data
US 2024/0259646 A1 Aug. 1, 2024

(51) Int. Cl.
*H04N 7/173* (2011.01)
*H04N 21/466* (2011.01)
*H04N 21/482* (2011.01)

(52) U.S. Cl.
CPC ..... *H04N 21/4826* (2013.01); *H04N 21/4667* (2013.01); *H04N 21/4668* (2013.01)

(58) Field of Classification Search
CPC ........... H04N 21/4826; H04N 21/4667; H04N 21/4668
See application file for complete search history.

(56) References Cited

U.S. PATENT DOCUMENTS

| | | | |
|---|---|---|---|
| 6,005,565 A * | 12/1999 | Legall | H04N 21/4622 715/969 |
| 8,903,834 B2 | 12/2014 | Ciancutti et al. | |
| 9,055,343 B1 * | 6/2015 | Lewis | H04N 21/25 |
| 9,542,649 B2 | 1/2017 | Su | |
| 10,360,508 B1 | 7/2019 | Gomez-Uribe et al. | |
| 10,631,029 B1 * | 4/2020 | Nijim | H04N 21/251 |
| 2014/0215506 A1 * | 7/2014 | Kalmes | H04N 21/4524 725/14 |
| 2015/0020126 A1 * | 1/2015 | Kegel | H04N 21/4667 725/87 |
| 2015/0052554 A1 * | 2/2015 | Iyengar | H04N 21/23106 725/35 |
| 2017/0070779 A1 * | 3/2017 | Kim | H04N 21/8549 |
| 2018/0152763 A1 * | 5/2018 | Barlaskar | H04N 21/4668 |
| 2018/0234715 A1 * | 8/2018 | Aggarwal | H04N 21/251 |
| 2018/0336645 A1 * | 11/2018 | Price | H04N 21/4661 |
| 2020/0007937 A1 * | 1/2020 | Polatkan | H04N 21/251 |
| 2020/0112769 A1 * | 4/2020 | Potluru | H04N 21/4668 |
| 2020/0278961 A1 * | 9/2020 | Wittke | G06F 16/248 |
| 2021/0021888 A1 * | 1/2021 | Han | H04N 21/816 |

(Continued)

OTHER PUBLICATIONS

U.S. Appl. No. 17/713,225, filed Apr. 4, 2022, Inventor Gallusser, et al., Titled "Model-Based Prediction for User Access of Content," 37 pages.

(Continued)

Primary Examiner — Annan Q Shang
(74) Attorney, Agent, or Firm — Kwan & Olynick LLP

(57) ABSTRACT

In some embodiments, a method identifies a target item. A first score for a bridge item is generated using a first input where the first input is based on a characteristic of an entity. A second score for the target item is generated using a second input. The second input is based on the characteristic of the entity and the bridge item. The method determines whether to output the bridge item to the entity based on the first score and the second score.

20 Claims, 7 Drawing Sheets

(56) References Cited

U.S. PATENT DOCUMENTS

| | | |
|---|---|---|
| 2022/0101157 A1 | 3/2022 | Huck et al. |
| 2022/0124409 A1* | 4/2022 | Wang ................ G06F 16/24578 |
| 2022/0182723 A1* | 6/2022 | Kim ................... H04N 21/4826 |
| 2022/0394349 A1* | 12/2022 | Sanders ............. H04N 21/4826 |
| 2023/0328323 A1* | 10/2023 | Jain .................... H04N 21/4668 |
| | | 725/14 |

OTHER PUBLICATIONS

U.S. Appl. No. 17/938,252, filed Oct. 5, 2022, Inventor Gallusser, et al., Titled "Scoring and Recommending a Media File," 55 pages.

\* cited by examiner

IDENTIFICATION OF BRIDGE ITEM BASED ON TARGET OUTPUT

BACKGROUND

A company may use a recommendation system to recommend items. For example, a video delivery system may recommend content to users that the users can request for delivery (e.g., stream). The recommendations may be based on the user's characteristics, such as the user's watch history, age, gender, etc. These recommendations may be items that a user may be mostly to watch. For example, the recommendation system may use the user's watch history to recommend content that is highly related to the content in the watch history. However, such recommendations generally are in a similar scope as the content in the watch history. Additionally, current recommendations are very short-term, such as what is the user most likely to be interested right this instant, and not longer term.

BRIEF DESCRIPTION OF THE DRAWINGS

The included drawings are for illustrative purposes and serve only to provide examples of possible structures and operations for the disclosed inventive systems, apparatus, methods and computer program products. These drawings in no way limit any changes in form and detail that may be made by one skilled in the art without departing from the spirit and scope of the disclosed implementations.

DETAILED DESCRIPTION

Figure 1:
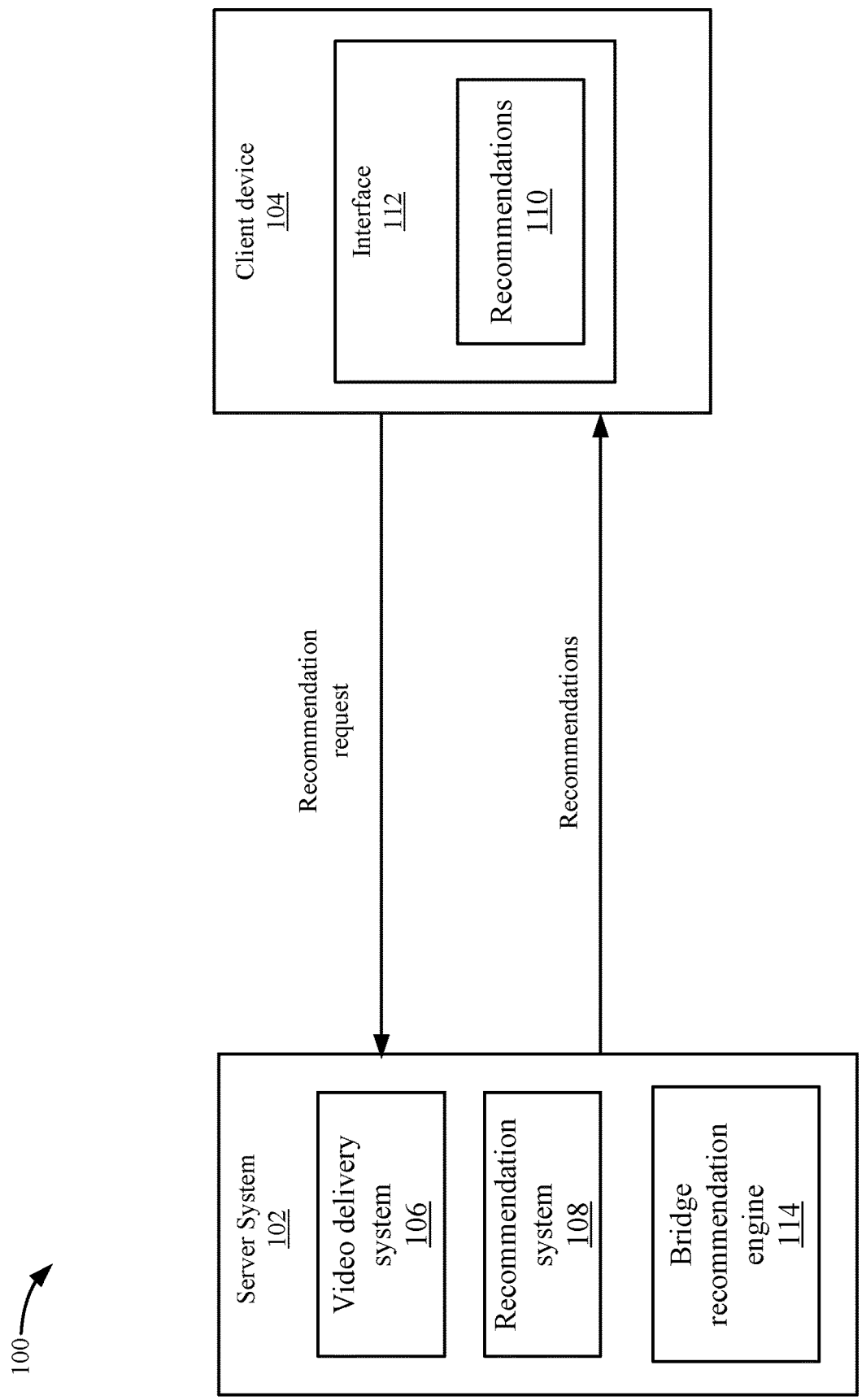
FIG. 1 depicts a simplified system for generating recommendations of bridge items according to some embodiments.

Described herein are techniques for a content analysis system. In the following description, for purposes of explanation, numerous examples and specific details are set forth to provide a thorough understanding of some embodiments. Some embodiments as defined by the claims may include some or all the features in these examples alone or in combination with other features described below, and may further include modifications and equivalents of the features and concepts described herein.

A recommendation system may want to recommend a target item to a user account. However, the recommendation system may first recommend a bridge item instead of the target item. After performing an action with the bridge item, it may be more likely that the user account may perform an action with the target item. In some examples, a company may want to have users perform an action with the target item, but the users may be unlikely to perform that action. However, the recommendation system may recommend the bridge item as an intermediate item that could cause the users to subsequently perform the desired action with the target item. In some examples, a video delivery system may want users to playback target content, such as a specific show, a movie, or a collection of shows or movies. Some reasons why the video delivery service would like users to playback the target content may be because the target content may have been established as having a strong causal relationship on favorable outcomes, such as retention and/or lifetime value for the video delivery system. For example, for a specific collection of content, such as a superhero collection of content, the collection may be large, and may include many instances of content that may engage the user long term. Thus, favorably introducing the user to the collection may reduce the likelihood of the user leaving the video delivery system because the user has many options of instances of content that are on the video delivery system and also may be released in the future. One problem is that the target content may be content that a user may not be likely to playback or may not be interested in at the current moment. However, the recommendation system may determine that bridge content may lead the user to subsequently request and playback the target content. Accordingly, the recommendation system may use a longer term approach of unlocking content the use could be interested in, but not immediately in the current moment. Although the above may describe using recommending content, the recommendations may be applied to other areas where actions are desired. For example, the recommendation may determine a bridge recommendation to purchase an item that may lead to the purchase of a target item. Another application may be to recommend shopping at a store for a toy, where the target is a business service that is in the same theme as the toy. In banking, the target may be opening a mortgage, but opening a savings account may be recommended as a bridge to opening a mortgage. A company may have many business units and may leverage a bridge recommendation to cross promote their business areas.

In some examples, a video delivery system may be organized around key franchises, such as a superhero universe. However, many users may not be fans or familiar with the superhero universe and have a very low probability of streaming any instance of content from the universe. But, one way to introduce the users to that universe may be through a sitcom show that happens to be in the universe, but is in a different format than most of the instances of content in the universe, which may be long form movies. For example, the sitcom show may be fun and shorter in length, compared to long form movies, or that the sitcom show may have characteristics that are relatable or intriguing to a viewer such as family dynamics or a likeable setting to the user. Also, a sitcom may have much more time over the series to explore backstories, interactions, etc. than a movie, which may have to start with an action part in the beginning. Accordingly, the sitcom show may be recommended as a bridge item because it may be more likely to be selected to playback than other titles in the superhero universe by a user who is not a fan right now of the universe. Once the sitcom show is played back, it may increase the probability that the other instances of content in the superhero universe may be requested for playback, which would open up a significant portion of the content that can be delivered to the user. The increase in content the user may want to play back may improve the retention of the user because the user may be more engaged with a larger amount of content offered by the video delivery service. This may also aid in content discovery beyond traditional means of keyword searching and providing recommendations of the content that is determined to be most related to the user's watch history and/or other characteristics. Also, the target items can be selected as those that have been separately identified as being high-value in terms of ability to causally retain users or high-value in terms of increasing likelihood to performing another action, such as purchasing merchandise, going on a cruise, visiting a park. The action caused by recommending the bridge item may result in unexpected connections and results, such as the user playing back the bridge item and then becoming interested in the target item, or playing back the bridge item, and then deciding to go on a cruise related to the bridge item. The outputted recommendation may be an improvement over another recommendation that just considered the user's watch history because the bridge content may be the most probable content that the user may playback based on the user's watch history and the target content.

The recommendation system may analyze multiple possible bridge items to select a bridge item to recommend to the user instead of recommending the target item. Accordingly, the recommendation system may not be initially recommending the target item, but rather recommends a bridge item that could lead to the user performing a desired action with the target item. This may be a significant improvement over recommending the target item directly because the user may not be likely to perform the action with the recommended target item if the recommended target item is recommended directly to the user. However, it may be possible that the user may perform the action associated with the bridge item and then perform the action with the target item. That is, the user may playback the bridge content, and like the bridge content. This may lead to the user playing back the target content because the target content is related to the bridge content.

To perform the recommendation of the bridge item, the recommendation system may be improved to analyze bridge items that could cause a user account to ultimately perform the desired action with the target item. This is an improvement over recommending or performing an analysis to recommend the target item directly. The recommendation of the bridge item may also be counterintuitive to what a recommendation typically strives to achieve and a significant improvement over recommending the target item directly because a user account may be more likely to perform the action with the target item after being recommended the bridge item.

As will be described in more detail below, the recommendation system may determine a first probability that the user account may perform an action with a bridge item and then a second probability that the user account may perform an action with the target item based on the user account performing the action with the bridge item. The action may include different actions, such as an interaction, selection, playback, watching, viewing, streaming, etc. For example, if the input includes a watch history, the first probability is based on the watch history and the probability that the user account would playback the bridge item based on the watch history. When playback is used, the playback may include different actions that are desired with respect to the bridge item and the target item. It is noted that there may be different desired actions for the bridge item and the target item. The playback may include a request to playback the bridge item. The playback may result in a user playing back the bridge content, which may mean the user plays back the bridge content for at least a portion of time, such as a percentage of time, X units of time, the entire content, etc. As such, the user may view, watch, stream, etc. the bridge content and/or target content. The probability may be based on the user playing back the bridge content. The amount of time the playback occurs may be configurable for the desired action. For example, the probability that is predicated may be that the user plays back (e.g., watches) 80 percent of the bridge content. Another probability may be that the user just requests the content, views or streams the content for a smaller percentage of time, etc. Then, the bridge item is added to the watch history, and the recommendation system determines a second probability whether the user account would playback the target item using the updated watch history. These two probabilities may be determined for a set of bridge items and the recommendation system may select a bridge item from the set of bridge items to recommend to the user account instead of the target item. If a combination of the first probability and the second probability is greater that a user account would playback the target content after playing back the bridge content compared to a third probability of directly playing back the target content, the recommendation system may have produced an improved recommendation by recommending the bridge item instead of the target item.

System Overview

FIG. 1 depicts a simplified system 100 for generating recommendations of bridge items according to some embodiments. System 100 includes a server system 102 and a client device 104. Although a single instance of server system 102 and a single instance of client device 104 are shown, multiples instances may be appreciated. For instance, server system 102 may include multiple servers or other computing devices to provide the functionality described herein. Also, system 100 may include multiple client devices that interact with one or more server systems.

Server system 102 may include a video delivery system 106 that is configured to cause delivery of content to client devices 104. In some embodiments, video delivery system 106 may use a content delivery network (CDN) (not shown) to deliver the content. The content may be requested by a user account associated with client device 104. For example, a user account may request videos, such as a movie, an episode of a show, etc. Although videos may be described, it will be understood that other content may also be delivered, such as audio, a website, a page of content, etc.

Client device 104 may be a computing device, such as a smartphone, living room device, personal computer, tablet, television, set-top box, etc. Client device 104 may include an interface 112 that may display content that is available for playback, such as a library of videos may be recommended. Also, a media player may playback the content, such as a video that is requested from video delivery system 106 is delivered and played back. A user account may use client device 104 and may be associated with a video delivery service (e.g., the user account signs up for the service) offered by video delivery system 106. A user that is associated with the user account may use client device 104.

Although multiple client devices 104 are not shown, video delivery system 106 may receive multiple requests from multiple client devices 104. Client devices 104 may send requests for content to video delivery system 106. For example, the requests may be for playback of different content, such as different videos.

Interface 112 may display recommendations 110. The recommendations may recommend different content. For example, the content may be videos offered by video delivery system 106. However, other recommendations may be appreciated, such as display advertisements, non-video content, such as webpages, audio, etc. When a recommendation for content is described, the recommendation may be for a single instance of content, such as a video; multiple instances of content, such as multiple videos; for a collection of content, such as a collection of videos; or for other units of content.

Video delivery system 106 may receive a request for recommendations, such as from client 104. For example, video delivery system 106 may receive a request for recommendations when interface 112 is generated. A recommendation system 108 may generate the recommendations. For example, the recommendations may be for content offered by video delivery system 106, such as videos. In some embodiments, video delivery system 106 may provide an interface that may display items that are ranked on interface 112. Then, the items may be displayed as recommendations 110 on interface 112. Selections from the user account may be received, such as a selection of a video for playback.

The general operation of recommendation system 108 will be discussed and then the use of recommendation system 108 to generate recommendations for bridge items. Recommendation system 108 may generate recommendations that may be items that may be determined to be pertinent to a user account. The items that are recommended may be based on an action that is desired, such as playing back the content, interacting with the content, purchasing a product, listening to music, reading an article, etc. The following may use an example for content, such as playing back videos. However, as will be discussed below, the recommendations may be applied to the areas, such as shopping, travel, banking, and other areas.

Recommendation system 108 may receive input items and generate an output item or items. When an output item is described, the output item may be one or more items, such as a single output item, multiple output items, a list of output items, an output item that represents a collection of items, etc. The input may include user characteristics (e.g., age, gender, tenure on the video delivery service, etc.), a history of the user account (e.g., a list and/or order of content already played back, time spent per day on the video delivery service, etc.), and other information. For a given set of inputs, recommendation system 108 may generate a score for output items in a list of output items. For example, the score may be the probability of a user account playing back an instance of content. Recommendation system 108 may sort the scores and recommend items that are more highly ranked to the user account. For example, recommendation system 108 may recommend instances of content with the highest scores, which may recommend the content that the user account may be more likely to playback.

As will be described in more detail below, a bridge recommendation engine 114 may control recommendation system 108 to generate scores for bridge items to recommend instead of a target item. Recommendation system 108 may be run in two stages to generate a score for multiple bridge items, which may be recommended instead of recommending the target item. Bridge recommendation engine 114 may analyze the scores for the bridge items and select one or more bridge items to recommend instead of the target item. The following will describe the operation of recommendation system 108 and bridge recommendation engine 114 in more detail.

Recommendation Process

Figure 2:
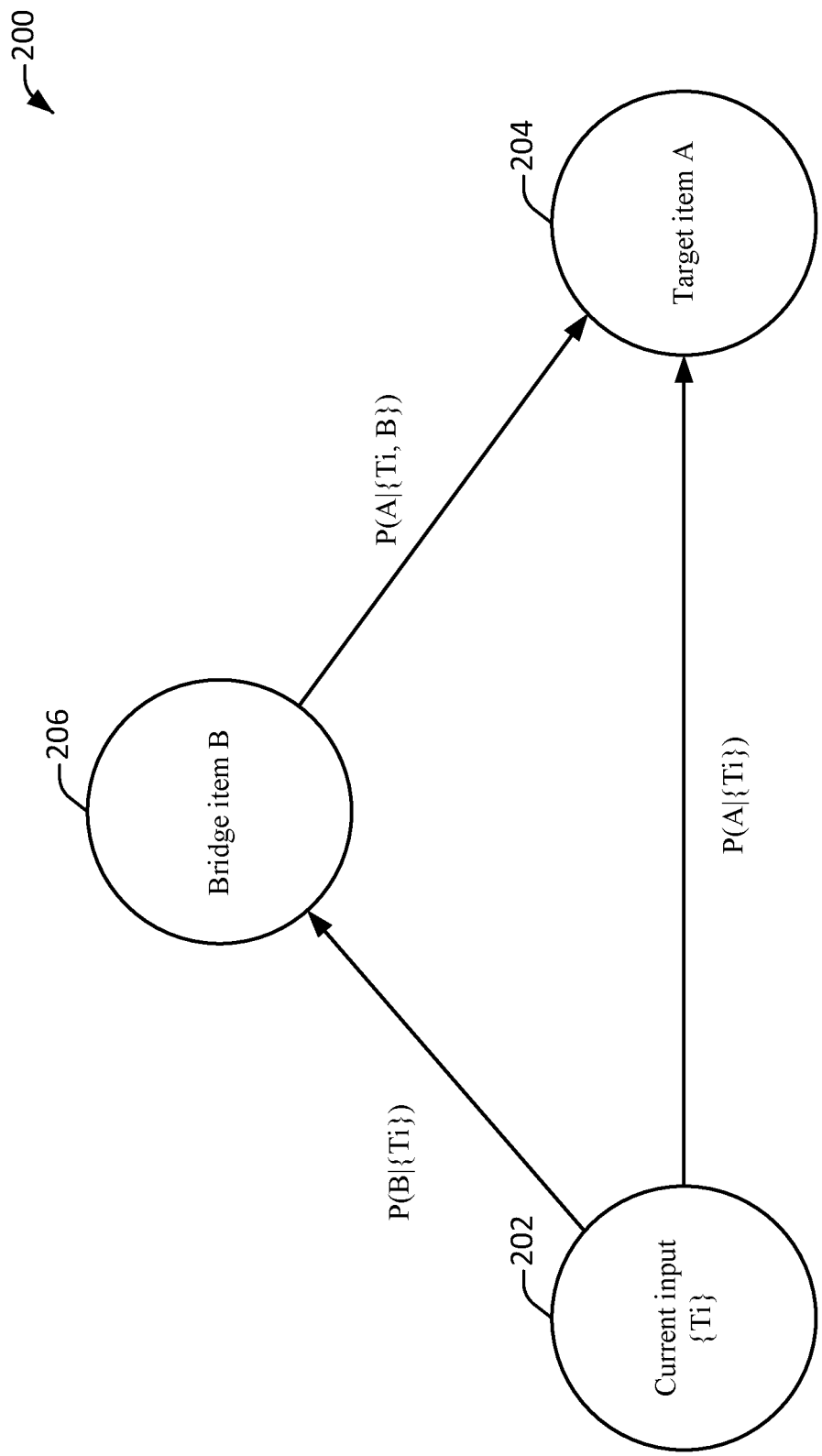
FIG. 2 depicts an example of a process for generating scores for a bridge item according to some embodiments.

FIG. 2 depicts an example 200 of a process for generating scores for a bridge item according to some embodiments. The following will describe a probability as the score, but other scores may be used, such as ratings, values within a range, etc. The score may rate the output item, such as the probability may be a relevance of an output item to the user account. The recommendation may be based on an action, such as a user account playing back on video delivery system 106. For example, the recommendation may be a probability of a user account taking an action with the output item.

At 202, a current status of the user account with an input $\{Ti\}$ is shown. The input may be based on characteristics of a user account, such as the user account's watch history of content, a user account's age, gender, etc. The input may be values, such as identifiers for content, the age of a user account, etc. The watch history may be content that was previously played back by the user account. The content may be from a time range, may be in an order of playback, may not be in an order of playback, or be in other formats.

At 204, an output of a target item A is shown. Recommendation system 108 may generate a probability $P(A|\{Ti\})$ for the target item A based on the input Ti. The probability for the target item is identified as an output. Target item A may be identified using different methods. For example, target item A may be identified automatically based on models. In some examples, video delivery system 106 may evaluate different target content to determine a causal effect on some outcome, such as retention or long-term engagement for the video delivery service. For example, a model may measure the effect of a given metric and determine that the target item A may affect retention positively. Also, target item A may be received based on from input of a user, such as a show may be input as a target. For example, the target item A may be determined based on domain expertise and social or business strategy. In some examples, a new instance of content that has been added to the video delivery system may be recommended as target item A to increase the engagement. Also, target item A may be content that may unlock a much broader set of content genres, such as a universe of science fiction content, nature content, scientific content, etc.

At 206, a bridge item B is shown. Recommendation system 108 may generate multiple probability scores in two stages for the bridge item. For example, in a first stage, recommendation system 108 generates a probability $P(B|\{Ti\})$ for bridge item B based on the input $\{Ti\}$. Then, in a second stage, recommendation system 108 may generate a probability $P(A|\{Ti, B\})$ for target item A based on the input of $\{Ti, B\}$. That is, in the first stage, recommendation system 108 generates a probability for bridge item B based on the current input $\{Ti\}$. Then, the input changes to include bridge item B in the second stage because this recommendation is based on the user account taking an action with item B (e.g., requesting and playing back item B). Thus, the probability for the output of target item A in the second stage includes the changed input that includes bridge item B.

Recommendation system 108 may compute the two probabilities for multiple bridge items. In some embodiments, recommendation system 108 may analyze all possible bridge items B that could be recommended to a user account. For example, all instances of content that could be played back by the user account may be analyzed. All the instances of content may include every instance of content offered by video delivery system 106 that the user account can playback except for the instances of content in the current input and the target item A. A subset of the content offered by video delivery system 106 may also be used.

Figure 3:
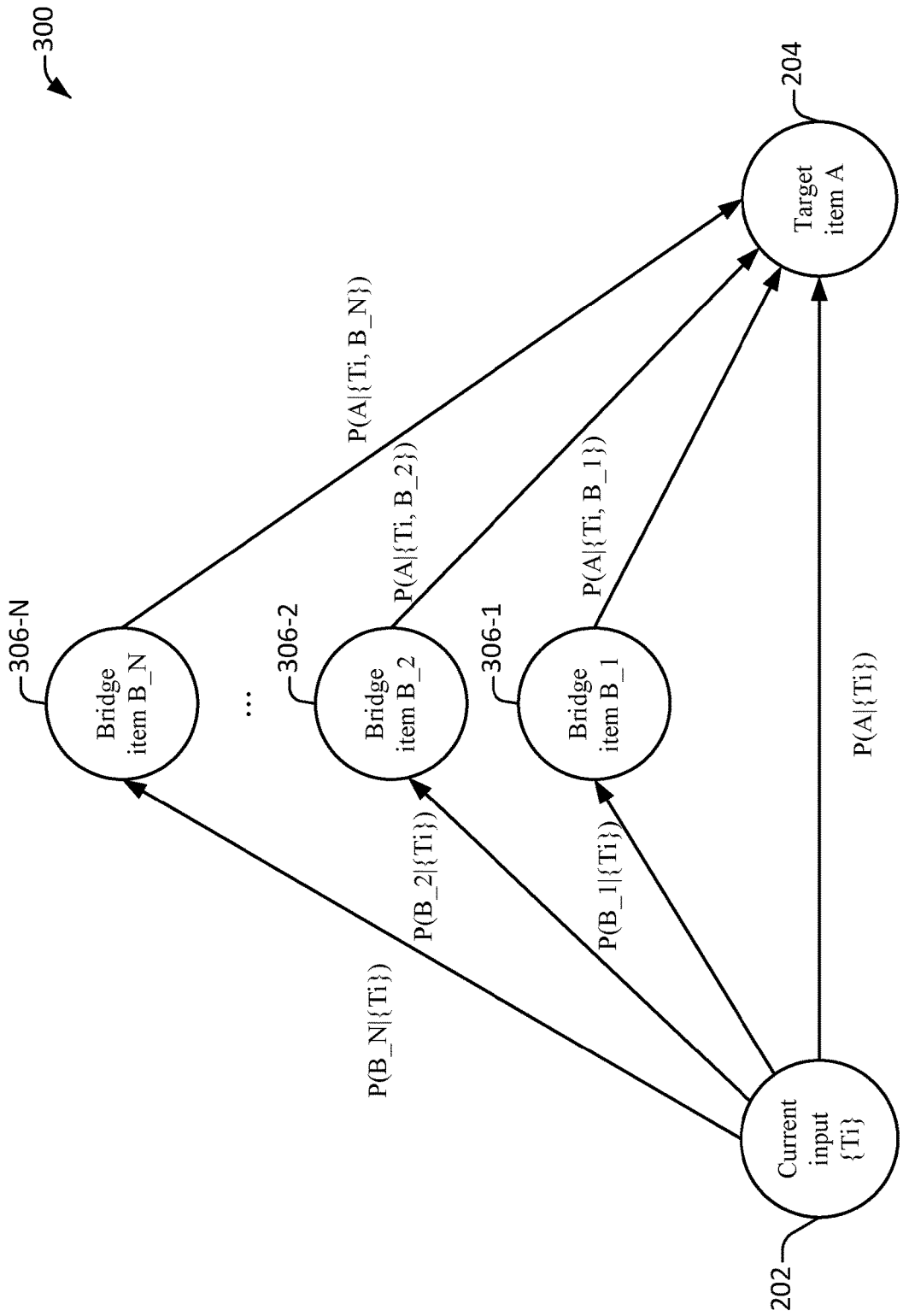
FIG. 3 depicts an example of a process for analyzing multiple bridge items according to some embodiments.

FIG. 3 depicts a process 300 for analyzing multiple bridge items according to some embodiments. At 202 and 204, the same current input {Ti} and target item A are shown. At 306-1 to 306-N, multiple bridge items N are shown of bridge item B_1, bridge item B_2, ..., bridge item B_N. Recommendation system 108 may generate the probabilities for each bridge item B_N, where N is a number. After receiving the two probabilities, bridge recommendation engine 114 may rank the bridge items and select a bridge item (or items) to recommend instead of target item A. For example, bridge recommendation engine 114 may compute a score based on the two probabilities from the two stages. In some embodiments, bridge recommendation engine 114 combines the two probabilities, such as via multiplication, a sum, or another aggregation. For example, bridge recommendation engine 114 generates a final score of $P(B|\{Ti\})*P(A|\{Ti, B\})$. Then, bridge recommendation engine 114 evaluates the final scores for each bridge title (B_1, B_2, ..., B_N), and ranks the bridge items to maximize the final scores. Bridge recommendation engine 114 may select one or more bridge items to recommend based on the ranking. For example, bridge recommendation engine 114 ranks bridge items by decreasing value of: $P(B\_j|\{Ti\})*P(A|\{Ti, B\_j\})$, where the i index is for user account and the j index is for the bridge items. In some embodiments, bridge recommendation engine 114 may rank the top N bridge items B based on the combined probability and output at least a portion of the bridge items B. For example, the highest ranked bridge item B or the top N bridge items B may be output.

Although a single bridge item is described, multiple bridge items that could lead to the target item may be used. For example, bridge items B1, B2, ... Bn may be used in a sequence to the target item. In some embodiments, bridge recommendation engine 114 may loop over all ordered sets of two bridge titles: {B1, B2}, {B1, B3}, ... {B1, Bn}, {B2, B1}, {B2, B3}, ... {B2, Bn}, {Bn,Bn−1} so n*(n−1) total possibilities. The order of playing back may matter, and both {B1,B2} and {B2,B1} may be used. For example, a user might be more likely to first playback bridge item B1, and then bridge item B2, then target item, compared to bridge item B2, then bridge item B1, then the target item. Accordingly, the bridge item may be a single item or ordered sets of multiple bridge items.

Bridge recommendation engine 114 may compare the bridge items that are selected to the target score for the target item. In some cases, it may be better to recommend the target item if the score for the target item is higher than the score for the bridge item.

The selection of a bridge item to recommend may provide a higher probability that the desired action for the target item may occur. For example, there may be a greater probability the user account will playback target content A after playing back bridge content B compared to playing back target content A directly. That is, the final score for the two probabilities calculated in the two stages for the bridge item is greater than the probability for the target item using the current input: $P(B|\{Ti\})*P(A|\{Ti, B\})>P(A|\{Ti\})$. This may mean that a user account may be more likely to playback bridge content B using the current input and then target content A using the updated input that includes bridge content B compared to directly playing back target content A using the current input. In a general example, if a user account is recommended and plays back a superhero sitcom, the sitcom may have characteristics in its content that may interest the user playing back the sitcom, such as a character, story telling narrative, etc. Then, the user account may be more likely to playback a superhero movie or movies compared to being recommended the superhero movie directly, which may not cause the user account to playback the superhero movie. Also, an animated movie about a character with a space theme may be used to target a show regarding a scientific theme of space.

The recommendation of the bridge item may include advantages even if the target item is not subsequently played back. For example, the playing back of bridge content B may be an improvement compared to if target content A was recommended directly and not being played back. That is, the user account may have found content B interesting and played back the content. This may lead to other results that are favorable for video delivery system 106 such as continued use of the service. If target content A was just recommended, then the user account may have taken no action to playback target content A or bridge content B.

Recommendation Method

Figure 4:
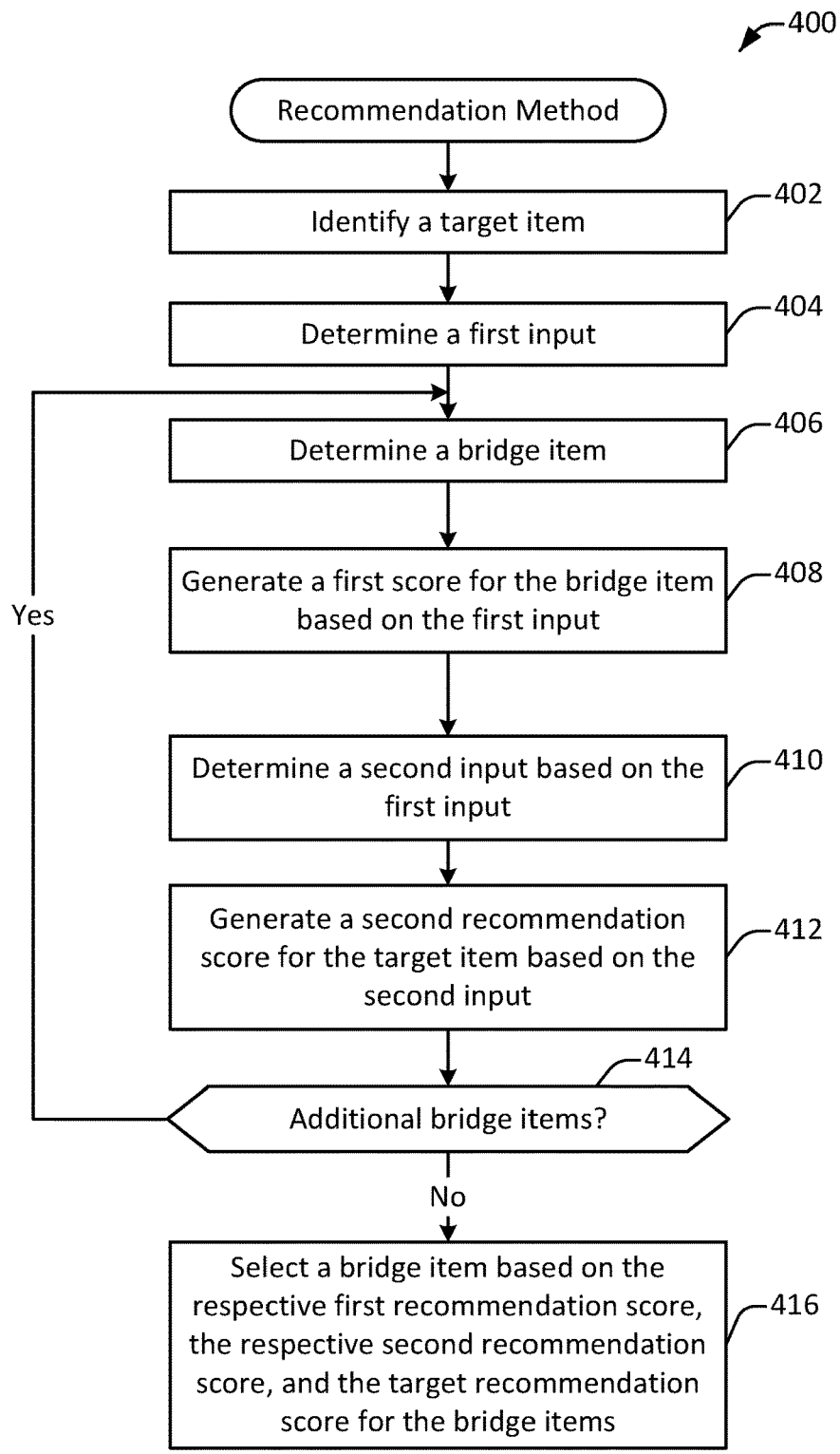
FIG. 4 depicts a simplified flowchart of a method for performing the recommendation process according to some embodiments.

FIG. 4 depicts a simplified flowchart 400 of a method for performing the recommendation process according to some embodiments. At 402, a target item is identified and received by recommendation system 108. As discussed above, the target item may be identified using different methods, such as manually or by automatic analysis.

At 404, recommendation system 108 determines a first input {Ti}. As discussed at 202 in FIGS. 2 and 3, this may be the input representing a current status for a user account, which may include a user account's watch history and other information associated with the user account, or other input not associated with the user account, such as time of day. For example, the watch history may include items X, Y, Z.

At 406, recommendation system 108 determines a bridge item. As discussed above at 206 with respect to FIG. 3, recommendation system 108 may analyze a set of bridge items and selects a bridge item in the set.

At 408, recommendation system 108 generates a first score for the bridge item B based on the first input. For example, as discussed at 306-1 in FIG. 3, the first score may be a probability that a user account will playback the bridge item B based on playing back items X, Y, Z.

At 410, recommendation system 108 determines a second input based on the first input, such as for target item A in FIG. 3. For example, the second input may include the bridge item, such as the watch history may include items X, Y, Z, and bridge item B as shown as {Ti, B_1} in FIG. 3.

At 412, recommendation system 108 generates a second score for the target item based on the second input. The second score may be a probability the user account will playback the target item based on the second input of items X, Y, Z, and bridge item B.

Recommendation system 108 may continue to analyze bridge items in the set of bridge items as discussed at 306-2 to 306-N in FIG. 3. At 414, recommendation system 108 determines whether there is an additional bridge item to analyze. If so, the process reiterates to 406 where another bridge item is determined and the first score and the second score for the new bridge item is determined. The first input for the new bridge item B_2 may be X, Y, Z. Then, the second input for the new bridge item B_2 is X, Y, Z, and bridge item B_2. That is, the first input is the same for all bridge items, but the target output is changed to be the respective bridge item, and the second input changes based on adding the respective bridge item to the second input.

Once all bridge items are analyzed, at 416, bridge recommendation engine 114 may select a bridge item B based on the respective first score and the respective second score for each bridge item. Different methods may be used to select the bridge item. The following will describe some examples of the selection of the bridge item in more detail.

Figure 5:
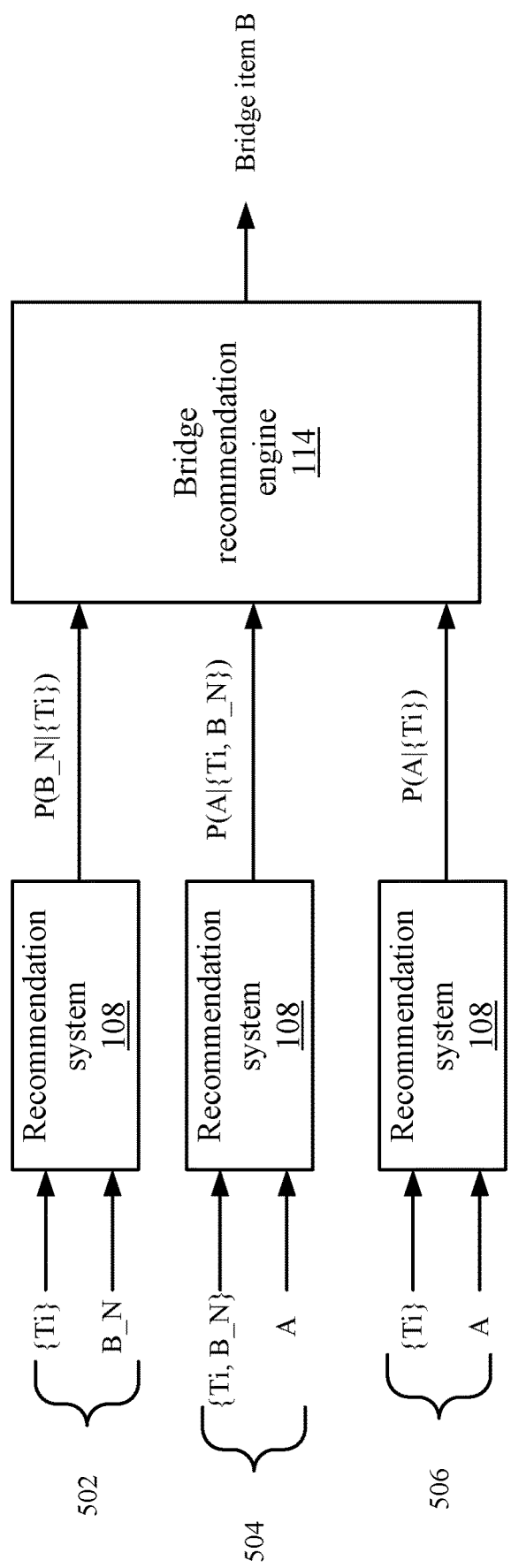
FIG. 5 depicts a more detailed example of selecting a bridge item according to some embodiments.

FIG. 5 depicts a more detailed example of selecting a bridge item B according to some embodiments. Recommendation system 108 may generate the first scores and the second scores for multiple bridge items B_N, where N is a number. For example, at 502, recommendation system 108 generates the first score for each bridge item. Then, at 504, in the second stage, recommendation system 108 generates the second score for each bridge item. Also, at 506, recommendation system 108 may generate a target score for the target item.

Bridge recommendation engine 114 may compare potential recommendations, such as the scores for the selected bridge item(s), to the target score for the target item. In some cases, it may be better to recommend the target item if the score for the target item is higher than the score for the bridge item. Bridge recommendation engine 114 then outputs a bridge item B, which may be one or more bridge items B.

Example

It is noted that bridge recommendation can be applicable to many areas requiring a recommendation, the following will describe an example. For clarity, the example will use titles, which may be instances of content (e.g., a movie, a show, a collection of shows or movies, etc.), and the score may be a probability of playing back the title for playback. A target title A that the user account has not played back yet and that video delivery system 108 would like them to playback is identified. Once the target title A is identified, recommendation system 108 calculates scores for a title T=R(T, {U, L}), where recommendation system 108 uses a function R to compute the score of a user account for a given title T based on user account-specific features U and list of past titles played back {L} (order might or might not be used depending on the recommendation system).

For a given target title A, bridge recommendation engine 114 reviews the set of bridge titles B excluding those already played back {S}, and computes:

$$R(B, \{U, L\}) * R(A, \{U, L, B\}) \text{ for every } B \text{ in } \{S\}.$$

In the above, the title B is the specific bridge title B being analyzed. A first score R(B, {U,L}) is based on a bridge title B with features U and past titles played back L. Then, a second score R(A, {U, L, B}) is based on the target title A with features U and past titles played back L and bridge title B. Bridge recommendation engine 114 generates the scores for every bridge title B, ranks them, and selects bridge items, such as using:

$$\text{Bridge title}(s)B = \text{argmax}\{R(B, \{U, L\}) * R(TT, \{U, L, B\})\}$$

Argmax may return a title based on a ranking of the scores, such as the title that maximizes the score. In some embodiments, bridge recommendation engine 114 may return the N highest ranked titles.

In one example, if there are five titles, the following variables are used:
L: a title which the user account has played back.
A: the target which video delivery system 106 wants the user account to eventually playback.
B1, B2, B3: three titles that the user account has not played back.

Recommendation system 108 may output the following as shown in Table I:

TABLE I

| Title B1 | R(B1, {U, L}) = 0.1 | R(A, {U, L, B1}) = 0.3 |
| Title B2 | R(B2, {U, L}) = 0.5 | R(A, {U, L, B2}) = 0.6 |
| Title B3 | R(B3, {U, L}) = 0.8 | R(A, {U, L, B3}) = 0.2 |
| Target Title A | R(A, {U, L}) = 0.2 | |

The first three entries are the first score and the second score for titles B1, B2, and B3, respectively. The fourth entry is the score for the target title A.

Next, bridge recommendation engine 114 determines the title that maximizes the value from the scores. For example, bridge recommendation engine 114 uses argmax {R(B, {U, L})*R(A, {U, L, B})} to analyze scores for B1, B2 and B3 as shown in Table II.

TABLE II

| R(B1, {U, L}) * R(A, {U, L, B1}) = 0.1 * 0.3 = 0.03 |
| R(B2, {U, L}) * R(A, {U, L, B2}) = 0.5 * 0.6 = 0.3 |
| R(B3, {U, L}) * R(A, {U, L, B3}) = 0.8 * 0.2 = 0.16 |

The scores for titles B1, B2, and B3 are 0.03, 0.3, and 0.16. Higher scores may be higher ranked meaning a higher probability that a user account may playback the respective title. Title B2 produces the highest value of 0.3. Also, the score of 0.3 is greater than the probability of 0.2 of playing back target title A directly without playing back any of the title Bs. Accordingly, bridge recommendation engine 114 outputs title B2 as the recommendation. Also, bridge recommendation engine 114 could rank the three titles and output the N highest titles, such as title B2 (0.3) and title B3 (0.16) if the top two titles are being output.

CONCLUSION

Accordingly, recommendation system 108 may recommend a bridge item instead of a target item. This may be significantly different than recommending the target item, but may achieve a better result. For example, instead of recommending instances of content that a user account most probably would playback based on user account characteristics, bridge recommendation engine 114 may recommend bridge content that may cause the user account to playback target content. There may be other content that is rated higher for the user account based on the input than the target content, but the instance of target content may have more value than the content the user account is most likely to playback. For example, if the user account is playing back horror movies, the most likely content a user account may playback next may be another horror movie. However, having the user account be interested in a superhero movie may provide more value to video delivery system 106. Using the bridge item improves the recommendation process in a counterintuitive process. To recommend the bridge item, the recommendation process is improved to calculate the bridge item that may most likely lead to the user account playing back the target item.

System

Figure 6:
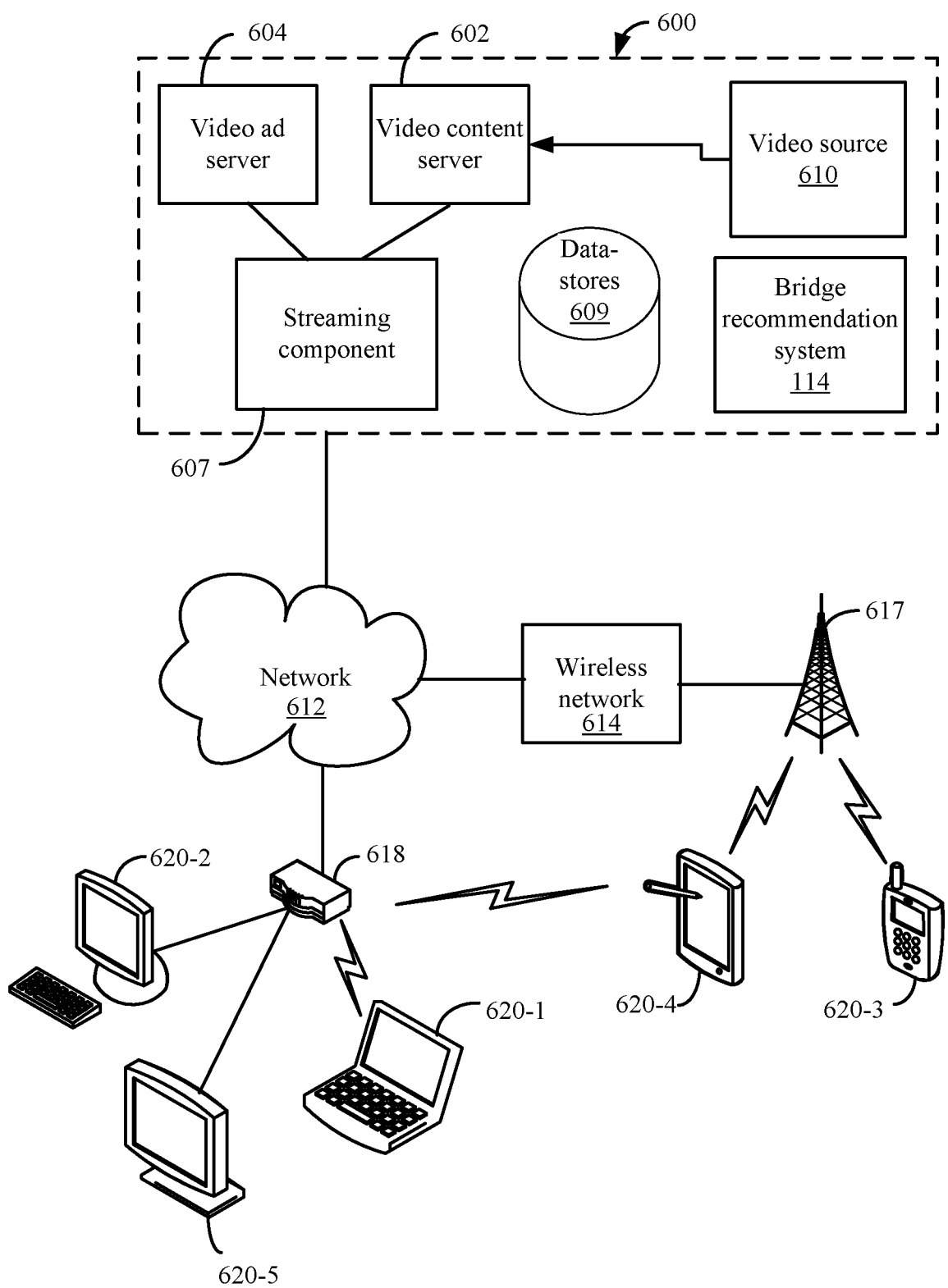
FIG. 6 depicts a video streaming system in communication with multiple client devices via one or more communication networks according to one embodiment.

Features and aspects as disclosed herein may be implemented in conjunction with a video streaming system 600 in communication with multiple client devices via one or more communication networks as shown in FIG. 6. Aspects of the video streaming system 600 are described merely to provide an example of an application for enabling distribution and delivery of content prepared according to the present disclosure. It should be appreciated that the present technology is not limited to streaming video applications and may be adapted for other applications and delivery mechanisms.

In one embodiment, a media program provider may include a library of media programs. For example, the media programs may be aggregated and provided through a site (e.g., website), application, or browser. A user can access the media program provider's site or application and request media programs. The user may be limited to requesting only media programs offered by the media program provider.

In system 600, video data may be obtained from one or more sources for example, from a video source 610, for use as input to a video content server 602. The input video data may comprise raw or edited frame-based video data in any suitable digital format, for example, Moving Pictures Experts Group (MPEG)-1, MPEG-2, MPEG-4, VC-1, H.264/Advanced Video Coding (AVC), High Efficiency Video Coding (HEVC), or other format. In an alternative, a video may be provided in a non-digital format and converted to digital format using a scanner or transcoder. The input video data may comprise video clips or programs of various types, for example, television episodes, motion pictures, and other content produced as primary content of interest to consumers. The video data may also include audio or only audio may be used.

The video streaming system 600 may include one or more computer servers or modules 602, 604, and 607 distributed over one or more computers. Each server 602, 604, 607 may include, or may be operatively coupled to, one or more data stores 609, for example databases, indexes, files, or other data structures. A video content server 602 may access a data store (not shown) of various video segments. The video content server 602 may serve the video segments as directed by a user interface controller communicating with a client device. As used herein, a video segment refers to a definite portion of frame-based video data, such as may be used in a streaming video session to view a television episode, motion picture, recorded live performance, or other video content.

In some embodiments, a video advertising server 604 may access a data store of relatively short videos (e.g., 10 second, 30 second, or 60 second video advertisements) configured as advertising for a particular advertiser or message. The advertising may be provided for an advertiser in exchange for payment of some kind or may comprise a promotional message for the system 600, a public service message, or some other information. The video advertising server 604 may serve the video advertising segments as directed by a user interface controller (not shown).

The video streaming system 600 also may include bridge recommendation system 114.

The video streaming system 600 may further include an integration and streaming component 607 that integrates video content and video advertising into a streaming video segment. For example, streaming component 607 may be a content server or streaming media server. A controller (not shown) may determine the selection or configuration of advertising in the streaming video based on any suitable algorithm or process. The video streaming system 600 may include other modules or units not depicted in FIG. 6, for example, administrative servers, commerce servers, network infrastructure, advertising selection engines, and so forth.

The video streaming system 600 may connect to a data communication network 612. A data communication network 612 may comprise a local area network (LAN), a wide area network (WAN), for example, the Internet, a telephone network, a wireless network 614 (e.g., a wireless cellular telecommunications network (WCS)), or some combination of these or similar networks.

One or more client devices 620 may be in communication with the video streaming system 600, via the data communication network 612, wireless network 614, or another network. Such client devices may include, for example, one or more laptop computers 620-1, desktop computers 620-2, "smart" mobile phones 620-3, tablet devices 620-4, network-enabled televisions 620-5, or combinations thereof, via a router 618 for a LAN, via a base station 617 for wireless network 614, or via some other connection. In operation, such client devices 620 may send and receive data or instructions to the system 600, in response to user input received from user input devices or other input. In response, the system 600 may serve video segments and metadata from the data store 609 responsive to selection of media programs to the client devices 620. Client devices 620 may output the video content from the streaming video segment in a media player using a display screen, projector, or other video output device, and receive user input for interacting with the video content.

Distribution of audio-video data may be implemented from streaming component 607 to remote client devices over computer networks, telecommunications networks, and combinations of such networks, using various methods, for example streaming. In streaming, a content server streams audio-video data continuously to a media player component operating at least partly on the client device, which may play the audio-video data concurrently with receiving the streaming data from the server. Although streaming is discussed, other methods of delivery may be used. The media player component may initiate play of the video data immediately after receiving an initial portion of the data from the content provider. Traditional streaming techniques use a single provider delivering a stream of data to a set of end users. High bandwidth and processing power may be required to deliver a single stream to a large audience, and the required bandwidth of the provider may increase as the number of end users increases.

Streaming media can be delivered on-demand or live. Streaming enables immediate playback at any point within the file. End-users may skip through the media file to start playback or change playback to any point in the media file. Hence, the end-user does not need to wait for the file to progressively download. Typically, streaming media is delivered from a few dedicated servers having high bandwidth capabilities via a specialized device that accepts requests for video files, and with information about the format, bandwidth, and structure of those files, delivers just the amount of data necessary to play the video, at the rate needed to play it. Streaming media servers may also account for the transmission bandwidth and capabilities of the media player on the destination client. Streaming component 607 may communicate with client device 620 using control messages and data messages to adjust to changing network conditions as the video is played. These control messages can include commands for enabling control functions such as fast forward, fast reverse, pausing, or seeking to a particular part of the file at the client.

Since streaming component 607 transmits video data only as needed and at the rate that is needed, precise control over the number of streams served can be maintained. The viewer will not be able to view high data rate videos over a lower data rate transmission medium. However, streaming media servers (1) provide users random access to the video file, (2) allow monitoring of who is viewing what video programs and how long they are watched (3) use transmission bandwidth more efficiently, since only the amount of data required to support the viewing experience is transmitted, and (4) the video file is not stored in the viewer's computer, but discarded by the media player, thus allowing more control over the content.

Streaming component 607 may use TCP-based protocols, such as HyperText Transfer Protocol (HTTP) and Real Time Messaging Protocol (RTMP). Streaming component 607 can also deliver live webcasts and can multicast, which allows more than one client to tune into a single stream, thus saving bandwidth. Streaming media players may not rely on buffering the whole video to provide random access to any point in the media program. Instead, this is accomplished using control messages transmitted from the media player to the streaming media server. Other protocols used for streaming are HTTP live streaming (HLS) or Dynamic Adaptive Streaming over HTTP (DASH). The HLS and DASH protocols deliver video over HTTP via a playlist of small segments that are made available in a variety of bitrates typically from one or more content delivery networks (CDNs). This allows a media player to switch both bitrates and content sources on a segment-by-segment basis. The switching helps compensate for network bandwidth variances and infrastructure failures that may occur during playback of the video.

The delivery of video content by streaming may be accomplished under a variety of models. In one model, the user pays for the viewing of video programs, for example, paying a fee for access to the library of media programs or a portion of restricted media programs, or using a pay-per-view service. In another model widely adopted by broadcast television shortly after its inception, sponsors pay for the presentation of the media program in exchange for the right to present advertisements during or adjacent to the presentation of the program. In some models, advertisements are inserted at predetermined times in a video program, which times may be referred to as "ad slots" or "ad breaks." With streaming video, the media player may be configured so that the client device cannot play the video without also playing predetermined advertisements during the designated ad slots.

Figure 7:
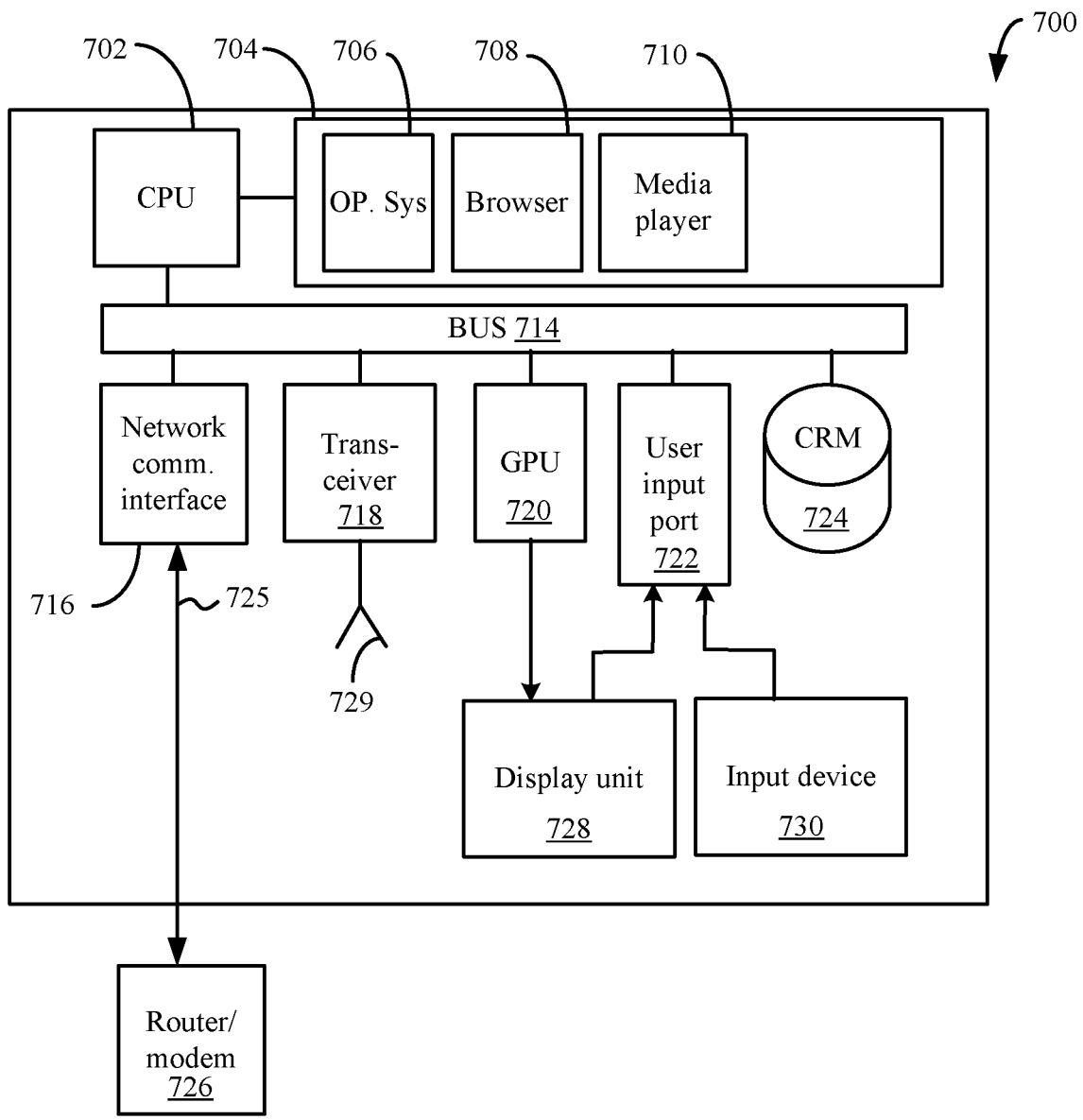
FIG. 7 depicts a diagrammatic view of an apparatus for viewing video content and advertisements.

Referring to FIG. 7, a diagrammatic view of an apparatus 700 for viewing video content and advertisements is illustrated. In selected embodiments, the apparatus 700 may include a processor (CPU) 702 operatively coupled to a processor memory 704, which holds binary-coded functional modules for execution by the processor 702. Such functional modules may include an operating system 706 for handling system functions such as input/output and memory access, a browser 708 to display web pages, and media player 710 for playing video. The memory 704 may hold additional modules not shown in FIG. 7, for example modules for performing other operations described elsewhere herein.

A bus 714 or other communication component may support communication of information within the apparatus 700. The processor 702 may be a specialized or dedicated microprocessor configured or operable to perform particular tasks in accordance with the features and aspects disclosed herein by executing machine-readable software code defining the particular tasks. Processor memory 704 (e.g., random access memory (RAM) or other dynamic storage device) may be connected to the bus 714 or directly to the processor 702, and store information and instructions to be executed by a processor 702. The memory 704 may also store temporary variables or other intermediate information during execution of such instructions.

A computer-readable medium in a storage device 724 may be connected to the bus 714 and store static information and instructions for the processor 702; for example, the storage device (CRM) 724 may store the modules for operating system 706, browser 708, and media player 710 when the apparatus 700 is powered off, from which the modules may be loaded into the processor memory 704 when the apparatus 700 is powered up. The storage device 724 may include a non-transitory computer-readable storage medium holding information, instructions, or some combination thereof, for example instructions that when executed by the processor 702, cause the apparatus 700 to be configured or operable to perform one or more operations of a method as described herein.

A network communication (comm.) interface 716 may also be connected to the bus 714. The network communication interface 716 may provide or support two-way data communication between the apparatus 700 and one or more external devices, e.g., the streaming system 600, optionally via a router/modem 726 and a wired or wireless connection 725. In the alternative, or in addition, the apparatus 700 may include a transceiver 718 connected to an antenna 729, through which the apparatus 700 may communicate wirelessly with a base station for a wireless communication system or with the router/modem 726. In the alternative, the apparatus 700 may communicate with a video streaming system 600 via a local area network, virtual private network, or other network. In another alternative, the apparatus 700 may be incorporated as a module or component of the system 600 and communicate with other components via the bus 714 or by some other modality.

The apparatus 700 may be connected (e.g., via the bus 714 and graphics processing unit 720) to a display unit 728. A display 728 may include any suitable configuration for displaying information to an operator of the apparatus 700. For example, a display 728 may include or utilize a liquid crystal display (LCD), touchscreen LCD (e.g., capacitive display), light emitting diode (LED) display, projector, or other display device to present information to a user of the apparatus 700 in a visual display.

One or more input devices 730 (e.g., an alphanumeric keyboard, microphone, keypad, remote controller, game controller, camera, or camera array) may be connected to the bus 714 via a user input port 722 to communicate information and commands to the apparatus 700. In selected embodiments, an input device 730 may provide or support control over the positioning of a cursor. Such a cursor control device, also called a pointing device, may be configured as a mouse, a trackball, a track pad, touch screen, cursor direction keys or other device for receiving or tracking physical movement and translating the movement into electrical signals indicating cursor movement. The cursor control device may be incorporated into the display unit 728, for example using a touch sensitive screen. A cursor control device may communicate direction information and command selections to the processor 702 and control cursor movement on the display 728. A cursor control device may have two or more degrees of freedom, for example allowing the device to specify cursor positions in a plane or three-dimensional space.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured or operable to perform that which is described in some embodiments.

As used in the description herein and throughout the claims that follow, "a," "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments and are presented to illustrate the flexibility and advantages of some embodiments as defined by the following claims. Based on the above disclosure and the following claims, other arrangements, embodiments, implementations, and equivalents may be employed without departing from the scope hereof as defined by the claims.

What is claimed is:

1. A method comprising:
   receiving by a computing device, a request for a recommendation;
   in response to receiving the request, performing:
      identifying, by the computing device, a target item as a target recommendation for an entity, wherein a bridge item is identified as an intermediate recommendation to recommend instead of the target item;
   in response to determining the target item, performing:
      inputting, by the computing device, a first input into a system to generate a first score that rates the bridge item based on the first input, wherein the first input is based on a characteristic of the entity;
      adding, by the computing device, the bridge item to the first input to generate a second input, wherein the bridge item is added to the first input to represent the intermediate recommendation of the bridge item being recommended;
      inputting, by the computing device, the second input into the system to generate a second score that rates the target item based on the second input;
      determining, by the computing device, whether to output the bridge item to the entity based on the first score and the second score; and
      when it is determined to output the bridge item, outputting the bridge item for the request for the recommendation, wherein the bridge item is output instead of the target item.

2. The method of claim 1, further comprising:
   generating respective first scores for respective bridge items in a plurality of bridge items using the first input; and
   generating respective second scores for the target item using a respective second input, wherein the second input is based on the characteristic of the entity and the respective bridge item in the plurality of bridge items.

3. The method of claim 2, wherein determining whether to output the bridge item comprises:
   comparing respective first scores and respective second scores for the plurality of bridge items and the bridge item; and
   selecting one of the bridge items in the plurality of bridge items and the bridge item to output.

4. The method of claim 3, wherein selecting the one of the bridge items comprises:
   selecting a bridge item with a highest ranked combination of the first score and second score.

5. The method of claim 3, wherein selecting the one of the bridge items comprises:
   combining the respective first score and the respective second score to generate a combined score for each bridge item in the plurality of bridge items and the bridge item;
   ranking the combined score for each bridge item in the plurality of bridge items and the bridge item; and
   selecting one or more of the bridge items based on the ranking.

6. The method of claim 5, wherein selecting the one of the bridge items comprises:
   generating a third score for the target item using the first input;
   comparing a respective combined score for a respective bridge item with the third score; and
   determining whether to output the respective bridge item based on the comparing.

7. The method of claim 6, wherein the respective bridge item is output when the combined score is rated higher than the third score.

8. The method of claim 1, wherein determining whether to output the bridge item comprises:
   generating a third score for the target item using the first input;
   comparing a combined score based on the first score and the second score for the bridge item with the third score; and
   determining whether to output the bridge item based on the comparing.

9. The method of claim 1, wherein identifying the target item comprises:
   automatically analyzing information for items using a model to select one of the items as the target item.

10. The method of claim 1, wherein identifying the target item comprises:
    receiving an identification of the target item.

11. The method of claim 1, wherein the characteristic of the entity comprises a history of usage of items for the entity.

12. The method of claim 1, wherein the characteristic of the entity comprises a history of items that were requested for playback by the entity.

13. The method of claim 1, wherein:
    the first input comprises a history of items that were requested for playback by the entity, and
    the second input comprises the history of items and the bridge item.

14. The method of claim 1, wherein:
    the first score comprises a probability that the entity would perform an action with the bridge item, and
    the second score comprises a probability that the entity would perform the action with the target item.

15. The method of claim 14, wherein:
    the action with the bridge item comprises playback of the bridge item, and
    the action with the target item comprises playback of the target item.

16. The method of claim 1, wherein:
    the bridge item comprises a first video,
    the target item comprises a second video, and
    the first video is output to the entity for playback.

17. The method of claim 1, wherein the request is received when an interface is generated.

18. A non-transitory computer-readable storage medium having stored thereon computer executable instructions, which when executed by a computing device, cause the computing device to be operable for:
  receiving, by a computing device a request for a recommendation;
  in response to receiving the request, performing:
    identifying, by the computing device, a target item as a target recommendation for an entity, wherein a bridge item is identified as an intermediate recommendation to recommend instead of the target item;
    in response to determining the t get item, performing:
      inputting, by the computing device, a first input into a system to generate a first score that rates the bridge item based on the first input, wherein the first input is based on a characteristic of the entity;
      adding, by the computing device, the bridge item to the first input to generate a second input, wherein the bridge item is added to the first input to represent the intermediate recommendation of the bridge item being recommended;
      inputting, by the computing device, the second input into the system to generate a second score that rates the target item based on the second input;
      determining, by the computing device, whether to output the bridge item to the entity based on the first score and the second score; and
    when it is determined to output the bridge item, outputting the bridge item for the request for the recommendation, wherein the bridge item is output instead of the target item.

19. The non-transitory computer-readable storage medium of claim 18, further operable for:
  generating respective first scores for respective bridge items in a plurality of bridge items using the first input; and
  generating respective second scores for the target item using a respective second input, wherein the second input is based on the characteristic of the entity and the respective bridge item in the plurality of bridge items.

20. An apparatus comprising:
  one or more computer processors; and
  a computer-readable storage medium comprising instructions for controlling the one or more computer processors to be operable for:
  receiving, by a computing device a request for a recommendation;
  in response to receiving the request, performing:
    identifying, by the computing device, a target item as a target recommendation for an entity, wherein a bridge item is identified as an intermediate recommendation to recommend instead of the target item;
    in response to determining the target item, performing:
      inputting, by the computing device, a first input into a system to generate a first score that rates the bridge item based on the first input, wherein the first input is based on a characteristic of the entity;
      adding, by the computing device, the bridge item to the first input to generate a second input, wherein the bridge item is added to the first input to represent the intermediate recommendation of the bridge item being recommended;
      inputting, by the computing device, the second input into the system to generate a second score that rates the target item based on the second input;
      determining, by the computing device, whether to output the bridge item to the entity based on the first score and the second score; and
    when it is determined to output the bridge item, outputting the bridge item for the request for the recommendation, wherein the bridge item is output instead of the target item.

* * * * *

UNITED STATES PATENT AND TRADEMARK OFFICE
CERTIFICATE OF CORRECTION

| | |
|---|---|
| PATENT NO. | : 12,335,576 B2 |
| APPLICATION NO. | : 18/160161 |
| DATED | : June 17, 2025 |
| INVENTOR(S) | : Fabian Gallusser and Lian Jian |

It is certified that error appears in the above-identified patent and that said Letters Patent is hereby corrected as shown below:

In the Claims

Claim 18, Column 17, Line 12: change "t get" to --target--

Signed and Sealed this
Thirtieth Day of September, 2025

John A. Squires
*Director of the United States Patent and Trademark Office*